J. P. WILLIAMS.
Coffee Pot.
No. 101,336.
Patented March 29, 1870.
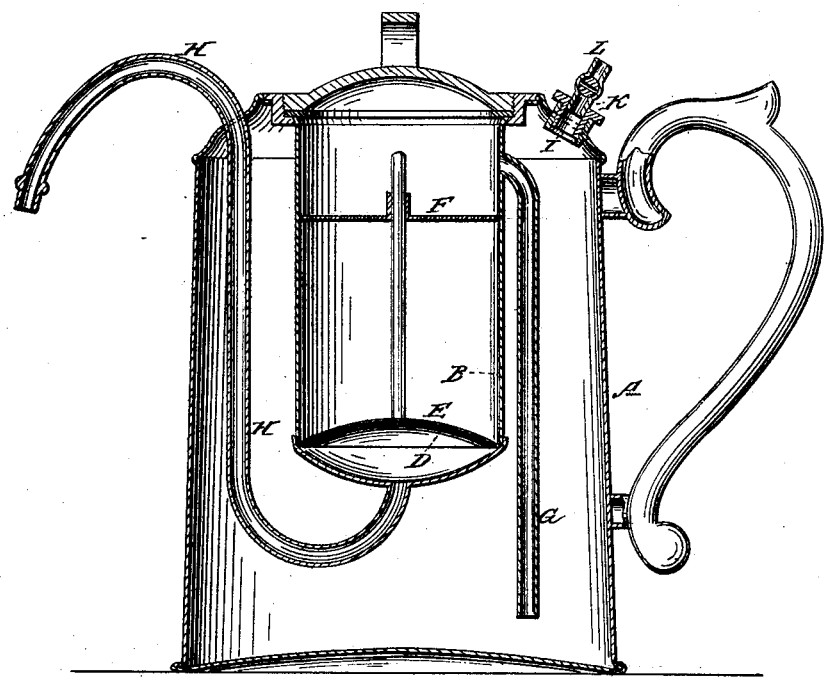
WITNESSES:
Edgar Tate
Jno. E. Brooks
INVENTOR:
John P. Williams
PER Munn & Co.
ATTORNEYS

United States Patent Office.

JOHN P. WILLIAMS, OF MOBILE, ALABAMA.

Letters Patent No. 101,336, dated March 29, 1870.

COFFEE-POT.

The Schedule referred to in these Letters Patent and making part of the same

*To all whom it may concern:*

Be it known that I, JOHN P. WILLIAMS, of Mobile, in the county of Mobile and State of Alabama, have invented a new and improved Coffee-Pot; and I do hereby declare that the following is a full, clear, and exact description thereof, which will enable others skilled in the art to make and use the same, reference being had to the accompanying drawing forming part of this specification.

This invention relates to improvement in coffee-pots, and consists in an arrangement with the exterior vessel of ordinary construction of an inner coffee-holder, from which the water of the outer vessel may be so separated that it may be kept in a boiling condition while that in the coffee-holder is in a fit state for use, the boiling water being forced into the coffee-holder only when there is sufficient steam in the outer vessel to convey it through a tube extending from below the steam-surface to the coffee-holder at the top, from which it may be poured for use, while the water boils in the said exterior vessel.

The drawing represents a sectional elevation of my improved coffee-pot.

A is the exterior vessel for holding and boiling the water.

B is the inner coffee-holder.

It is connected to and suspended from the top of vessel A, and has a screw-plug, C, screwing down into a large opening into it through the top of the vessel A, steam-tight.

It is provided with a strainer, D, near the bottom, and may have other strainers, E F, supported in any way between the top and bottom.

G is a tube opening into this coffee-holder near the top, and extending down in the vessel A near the bottom.

H is a pipe, leading from the bottom of the holder B out through the vessel A, for pouring the coffee.

I is the tube or opening for pouring the water into the vessel A.

It is provided with a plug, K, screwing in steam-tight, and has a stop-cock, L, for permitting the escape of the steam when required.

The coffee being placed in the holder B and the water in the vessel A and steam generated, the water from the bottom will be forced by the pressure of the steam through the pipe G into the holder with the coffee, where the infusion will take place with little or no agitation of the water by boiling, so that the coffee may be drawn off in a settled and fit state for use while the water boils in the vessel A.

Moreover, the steam cannot escape, unless permitted by turning the cock L, and the loss of aroma caused thereby in the pot as commonly arranged, is prevented.

No danger of explosion by the steam exists, because of the passage through the pipes G H, and the holder, through which the water can escape to make room for the steam.

Having thus described my invention,

I claim as new and desire to secure by Letters Patent—

1. The combination with the exterior boiler A and interior coffee-holder B, of a steam-plug and tube G to boil the water and supply the same, as shown and described.

2. The combination of vessel B, strainers D E F, spout H, and steam-receiving tube G to generate coffee without agitation of the ground berry, or loss of aroma, as set forth.

JOHN P. WILLIAMS.

Witnesses:
JOHN W. YOUNAN,
T. J. TORRANS.